(12) United States Patent
Edvardson

(10) Patent No.: US 9,959,574 B2
(45) Date of Patent: May 1, 2018

(54) RISK ASSESSMENT

(75) Inventor: Hannes Edvardson, Uppsala (SE)

(73) Assignee: CINNOBER FINANCIAL TECHNOLOGY AB, Stockholm (SE)

( * ) Notice: Subject to any disclaimer, the term of this patent is extended or adjusted under 35 U.S.C. 154(b) by 172 days.

(21) Appl. No.: 13/160,013

(22) Filed: Jun. 14, 2011

(65) Prior Publication Data
US 2012/0323752 A1  Dec. 20, 2012

(51) Int. Cl.
G06Q 40/00 (2012.01)
G06Q 40/08 (2012.01)

(52) U.S. Cl.
CPC .................. G06Q 40/08 (2013.01)

(58) Field of Classification Search
CPC ...................................... G06Q 40/00
USPC ................................ 705/36 R, 38
See application file for complete search history.

(56) References Cited

U.S. PATENT DOCUMENTS

| | | | | |
|---|---|---|---|---|
| 5,687,968 | A | * | 11/1997 | Tarantino ................. 273/139 |
| 6,098,051 | A | * | 8/2000 | Lupien et al. ............. 705/36 R |
| 6,278,982 | B1 | * | 8/2001 | Korhammer et al. ...... 705/36 R |
| 7,315,840 | B1 | * | 1/2008 | Keith .......................... 705/37 |
| 8,073,763 | B1 | * | 12/2011 | Merrin et al. ............... 705/37 |
| 8,359,260 | B2 | * | 1/2013 | Merrin et al. ............... 705/37 |
| 2005/0080703 | A1 | * | 4/2005 | Chiesa et al. ............... 705/36 |
| 2005/0124408 | A1 | * | 6/2005 | Vlazny et al. ............... 463/28 |
| 2009/0106140 | A1 | * | 4/2009 | De La Motte .............. 705/37 |

* cited by examiner

Primary Examiner — Kirsten Apple
(74) Attorney, Agent, or Firm — Finnegan, Henderson, Farabow, Garrett & Dunner LLP

(57) ABSTRACT

A clearing system comprising: a database for storing a plurality of accounts; and a risk manager for carrying out a risk assessment for a group of accounts comprising one or more accounts of said plurality of accounts; said risk manager being configured to update a risk assessment for a group of accounts each time the clearing system receives information about a new event affecting at least one account of said group of accounts. The event may be a new trade. The trade may be reported to the clearing system as soon as it has been settled.

13 Claims, 3 Drawing Sheets

RISK ASSESSMENT

FIELD OF THE INVENTION

The invention relates to risk management in financial systems.

BACKGROUND OF THE INVENTION

Electronic trading systems typically comprise a trading system and a clearing house. The clearing house handles all activities from the time a commitment is made for a transaction in the trading system until the trade is settled. A clearing house is legally required to calculate margin requirements for the members clearing through the clearing house. A margin requirement is used to cover the highest probable loss a portfolio may experience before the risk of the portfolio can be hedged in event of a default situation. The clearing house is required to demand sufficient collateral from each member as security to meet that member's margin requirement. The margin requirement is dependent both on the member positions and on the market data used in the calculations.

The clearing house typically receives information about new transactions a few times a day from the trading system and carries out new risk assessments to establish the margin requirements for the accounts at the end of the day or a few times a day. If the updated risk assessments show that the collateral provided by a member is lower than the margin requirement for that member, the member is requested to provide additional collateral. If the member does not provide additional collateral as security, the clearing house may instruct the trading system to stop taking orders from the member until the member has provided additional collateral. A disadvantage with this method is that at the time when the trading system is instructed to stop taking orders from a member, the trading system may already have matched a number of additional orders entered by the member with other members' orders. The trading system can cancel the trades, but that means that the other members' orders would have to be released and the matching process would have to be re-started.

The invention aims to improve on the prior art.

SUMMARY OF THE INVENTION

According to the invention, there is provided a clearing system comprising a database configured to store a plurality of accounts; and a risk manager configured to carry out a risk assessment for a group of accounts comprising one or more accounts of said plurality of accounts; said risk manager being configured to update a risk assessment for a group of accounts each time the clearing system receives information about a new event affecting at least one account of said group of accounts.

The new event may be a new trade. The risk manager may be configured to commence updating the risk assessment for the group immediately after the clearing system has received information about the new trade. The clearing system may comprise trade processing means for processing a trade and the risk manager may be configured to commence updating the risk assessment for the group after the trade processing means have processed the trade. The risk assessment may be a margin requirement calculation.

Since the current risk is updated every time a new trade is entered, and not just at predetermined times of the day, additional collateral can be requested from the members of the clearing system sooner. If the trading system reports the trades as they are matched, the clearing system can request additional assets from the members involved in the trades, if required, before further trades involving the members are matched or at least limit the number of trades that are matched. Consequently, the discrepancy between the value of the collateral provided by a member as security and the highest probable loss the portfolio of the member may experience is at all times minimised.

Accordingly, the invention allows the risks associated with the accounts to be calculated in real-time and allows the clearing house to ask its members for additional security if required without delay.

The new event may also be a change to market data. Additionally, in one embodiment, the plurality of accounts may be organised into a structure comprising a plurality of groups of accounts, said plurality of groups comprising said group of accounts and the risk manager may be configured to net the positions held in the accounts of a group when carrying out said real-time risk assessment. The event may then comprise a change to the structure.

The risk manager may be configured to carry out risk assessments using a predetermined algorithm for a first and a second group of accounts, the first and the second group of accounts comprising the same accounts and the risk manager being configured to carry out the risk assessment for the second group with different parameters to the risk assessment for the first group to stress-test said predetermined algorithm.

The clearing system may further comprising an account manager configured to receive information about said event, the risk manager being configured to receive information about said event from the account manager, the account manager comprising a first memory for storing information about said accounts and the risk manager comprising a second memory for storing information about said accounts. The account manager may be configured to receive the information in real-time.

The risk manager may comprise a plurality of servers configured to carry out risk assessments for a plurality of groups of accounts in parallel.

According to the invention, there is also provided a system comprising the clearing system and a trading system configured to report matched trades to the clearing system in real-time.

According to the invention, there is also provided a method for managing risk associated with accounts of a clearing system, comprising; storing a plurality of accounts organised into a structure comprising a plurality of groups of accounts, each group comprising at least one account; carrying out a risk assessment for each group of accounts; and updating the risk assessment for a group of accounts each time the clearing system receives information about a new event affecting at least one account of said group of accounts.

The new event may be a new trade. The new event may be a change to market-data. The new event may also be a change to said structure.

Carrying out a risk assessment may comprise calculating a margin requirement.

Updating the risk assessment may comprise updating the risk assessments in real-time.

The clearing system may comprise an account manager and a risk manager and the method may further comprise receiving information about said event in the account manager and storing said information in a memory of the account manager; sending information about said event from the account manager to the risk manager; receiving said information in said risk manager; storing said information in a memory of the risk manager; and updating the risk assessment using information stored in said memory of the risk manager.

The method may further comprise receiving, in said account manager, information about said event in real-time from a trading system.

The method may further comprise carrying out the risk assessments for the plurality of groups of accounts in parallel.

According to the invention, there is also provided a computer program comprising instructions that when executed by a processor cause the processor to carry out the above method.

According to the invention, there is also provided a clearing system comprising: means for storing a plurality of accounts; and means for carrying out a risk assessment for a group of accounts comprising one or more accounts of said plurality of accounts; said means for carrying out a risk assessment being configured to update a risk assessment for a group of accounts each time the clearing system receives information about a new event affecting at least one account of said group of accounts.

BRIEF DESCRIPTION OF THE DRAWINGS

Embodiments of the invention will now be described, by way of example, with reference to FIGS. 1 to 7 of the accompanying drawings, in which.

DETAILED DESCRIPTION

Figure 1:
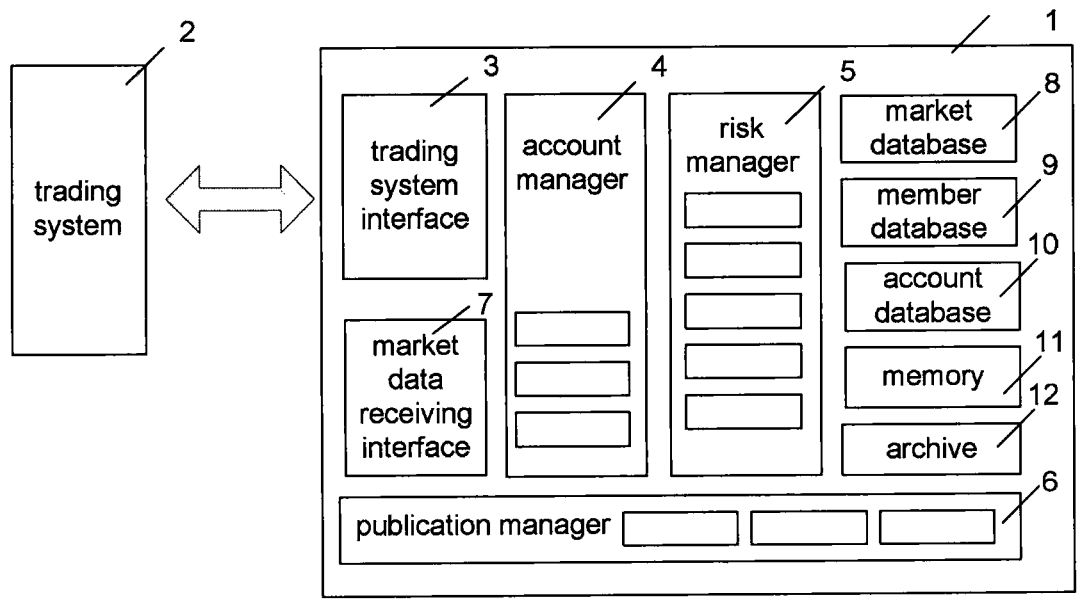
FIG. 1 is a schematic block diagram showing a clearing system in communication with a trading system.

With reference to FIG. 1, a clearing system 1 is shown in communication with a trading system 2. The clearing system 1 handles all activities from the time a commitment is made for a transaction in the trading system until the trade is settled. The clearing system 1 receives details of created trades from the trading system 2. Once a trade has been settled, the clearing system 1 reports back to the trading system 2. It may also inform the trading system 2 if a member has not provided sufficient collateral as security to match the risk associated with the member's accounts. The trading system reports a trade to the clearing house in real-time. In other words, it may report a new trade as soon as the orders have been matched. The clearing system 1 comprises a trading system interface 3, an account manager 4, a risk manager 5 and a publication manager 6. The trading system interface 3 receives details of trades from the trading system 2. The trading system interface 3 also returns information about settled trades. Additionally, the trading system interface 3 returns information about the risks associated with the accounts held by the clearing system to the trading system 2. The account manager 4, the risk manager 5 and the publication manager 6 may each comprise a plurality of servers and the servers are configured to carry out a number of tasks for managing the accounts, calculating the risks associated with certain accounts to ensure that the members have provided enough collateral to the clearing system as security and publishing information to the users of the system. The tasks carried out by the account manager 4, the risk manager 5 and the publication manager 6 will be described in more detail below.

It is contemplated that each risk manager server and each publication server is configured as a slave to one or more account manager servers. Different account manager servers handle different accounts and the risk manager servers and the publication servers handle the risk assessments and the publication of information respectively for the accounts of the account manager server for which they act as slaves. In some embodiments, servers are partitioned per member. For example, accounts belonging to a number of members may be allocated to the same specific account manager server and the risk assessments for the different members may be carried out by different risk manager servers of the risk manager servers that act as slaves to the account manager server. One or more risk manager servers may be used for each member. Some servers may also carry out risk calculations for a number of different members.

The trading system interface 3 may comprise messaging software configured to receive information about trades from the trading system and to send incoming information about new trades to the right account manager server. The account manager servers then notify the new trades to the risk manager servers for the risk manager servers to carry out risk assessments. Additionally, the account manager servers forward information to be published to the publication servers. The trading system interface 3 also comprises messaging software for forwarding information from the account manager to the trading system.

The clearing system further comprises a market data receiving interface 7 for receiving up-to-date market data. The market data may be received from the trading system 2 or from third parties. When new market data has been received, the market data receiving interface 7 informs the account manager 4.

The clearing system further comprises a number of databases. It comprises a market database 8 for storing the up-to-date market data received from the market data receiving interface 7. It also comprises a member database 9 for storing details of the members clearing through the clearing system and the users that need to access data stored by the clearing system. A clearing system has two types of members, clearing members, CM1, CM2 and CM3, and non-clearing members, NCM1, NCM2, NCM3, as will be described in more detail below. The users may either be clearing house officials or attached to a particular clearing or non-clearing member. The clearing system further comprises an account database 10 for storing details of the accounts used by the members, details of instruments held by the accounts and details of the risk algorithms used to carry out risk assessments for the accounts.

The clearing system also comprises a memory 11 for storing additional data and software required. For example, the memory may store additional data and programme code for analysing different types of instruments and for carrying out risk assessments. The clearing system may further comprise an archive 12. The archive 12 stores data for allowing historical changes to the accounts and the risk assessments to be monitored and reports to be generated. It is contemplated that the clearing system also comprises an interface (not shown) for allowing users to request changes to their accounts and to inform the clearing system of any changes to the member details.

Figure 2:
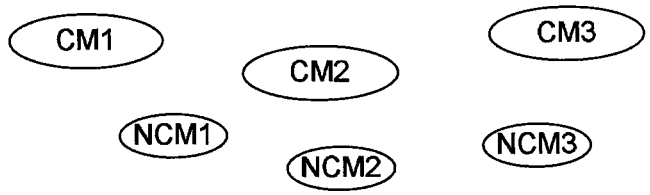
FIG. 2 is a schematic block diagram showing components of the account manager of the clearing system.
Figure 2:
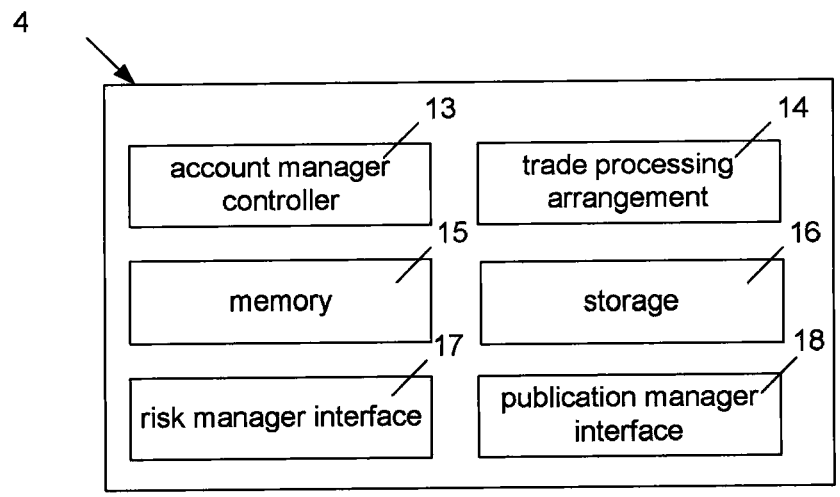

With reference to FIG. 2, each server of the account manager 4 comprises an account manager controller 13, a trade processing module 14, a volatile memory 15 and storage 16. The volatile memory 15 may be a random access memory (RAM). It may store data that needs to be accessed quickly. The storage 16 may be a non-volatile memory and may be provided by hard disk drives. At start-up, the account manager may load the contents of the account database 10 and also the contents of the accounts stored in the hard disk drives 16 to the volatile memory 15 to be directly accessible by the account manager controller. At the end of the day, when all trades have been cleared, the account database 10 may be updated based on the account data stored in the volatile memory 15 and the contents of the accounts may be written to one or more files in the hard disk drive 16 of the server. Each account manager server therefore stores a copy of the contents of the accounts. It should be realised that the system does not have to be restarted every day. It can be restarted more or less often. For example, it is contemplated that the system can be restarted once every week. The account manager may also write data to the storage 16 in order to, for example, recover quickly in case of a hardware fault or facilitate fault-finding in some circumstances. Each server of the account manager 4 also comprises a risk manager interface 17 for interfacing with the risk manager 5 and a publication manager interface 18 for interfacing with the publication manager 6.

Figure 3:
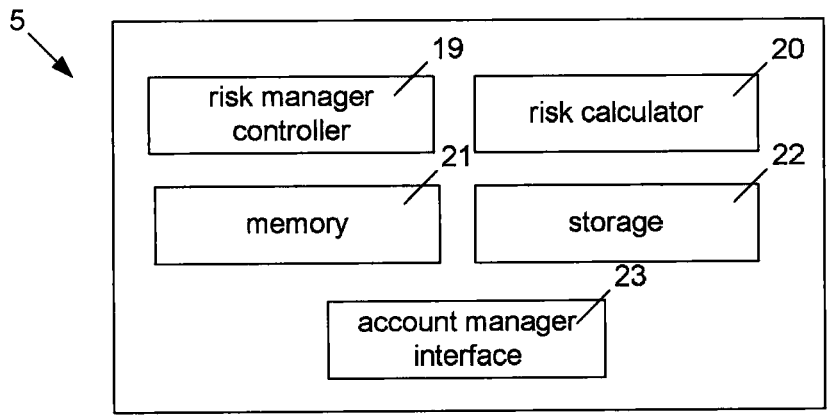
FIG. 3 is a schematic block diagram showing components of the risk manager of the clearing system.

With reference to FIG. 3, every risk server of the risk manager 5 comprises a risk manager controller 19 for controlling the risk manager server and a risk calculator 20 for carrying out the risk assessments. The risk manager controller 19 decides whether a risk assessment needs to be carried out for an account or a group of accounts and allocates the task to an instance of the risk calculator 20. The risk calculator 20 may be running a plurality of risk calculations at the same time. The risk manager controller 19 may delegate a new risk assessment to a portion of a server available to carry out the risk assessment.

Each server of the risk manager 5 also comprises a volatile memory 21 and storage 22 for storing data that is required for the risk manager to perform the risk calculations. The volatile memory 21 may be a RAM memory. The storage 22 may be non-volatile memory provided by hard disk drives. When the system is activated, the content of the account database 10 is loaded into the volatile memory 21 of the risk manager. The contents of the accounts are also loaded from the account manager 4 into the volatile memory 21 to allow the contents of the accounts to be easily accessed by the risk manager controller 19 and risk calculator 20. If any changes to the account structure occur during the day, both the volatile memory 15 of the account manager 4 and the volatile memory 21 of the risk manager 5 are updated. Moreover, if a new trade is received, the account manager 4 informs the risk manager 5 and the risk manager stores details of the new trade in memory 21. The risk manager may write data to the storage 22 in order to, for example, recover quickly in case of a hardware fault or facilitate fault-finding in some circumstances.

The risk manager servers 5 also comprise an account manager interface 23 for interfacing with the account manager. As mentioned above, each risk manager may act as a slave to one or more account manager servers and may receive instructions from, and report back to, the one or more account manager servers. It is contemplated that, in some implementations, each risk server may store information of all new trades but will only access the information necessary to carry out the required risk assessments allocated to that server.

Figure 4:
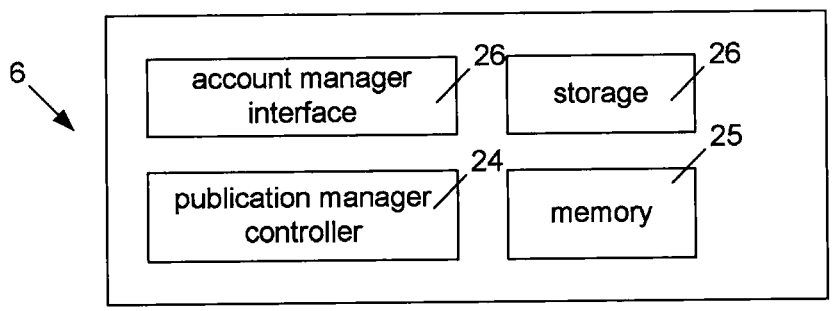
FIG. 4 is a schematic block diagram showing components of the publication manager of the clearing system.

With reference to FIG. 4, each server of the publication manager 6 comprises a publication manager controller 24 for processing data to be published. The publication manager 6 also comprises a volatile memory 25 and storage 26. The volatile memory 25 may be a RAM memory and the storage 26 may be a non-volatile memory provided by the hard disk drives of the publication servers. Records from the member database 9 and the account database 10 may be loaded into the memory 25 on start-up to allow the publication manager to determine access rights to the information to be published. The memory may also store records of user subscriptions to account updates. The storage 26 may store code and data for processing and publishing the information received by the publication manager. Some or all of the code and data may also be loaded into the volatile memory 25 at start-up to be easily accessible by the publication manager controller 24. The publication manager may also write data to the storage 26 from the volatile memory in order to, for example, recover quickly in case of a hardware fault. The publication manager also comprises an account manager interface 26 for receiving the information to be published from the account manager 4. The account manager controller 13 may broadcast information to be published, together with information indicating the access rights to the information, to the publication manager servers which act as gateways to the users and forward the information to the users that have the right to access the information.

The components of the account manager, risk manager and publication manager described with respect to FIGS. 2, 3 and 4 may be implemented using hardware, software or a combination of both. It is contemplated that the controllers 13, 19, 24 are provided by processor arrangements having internal memory for storing programme code and required data.

Figure 5:
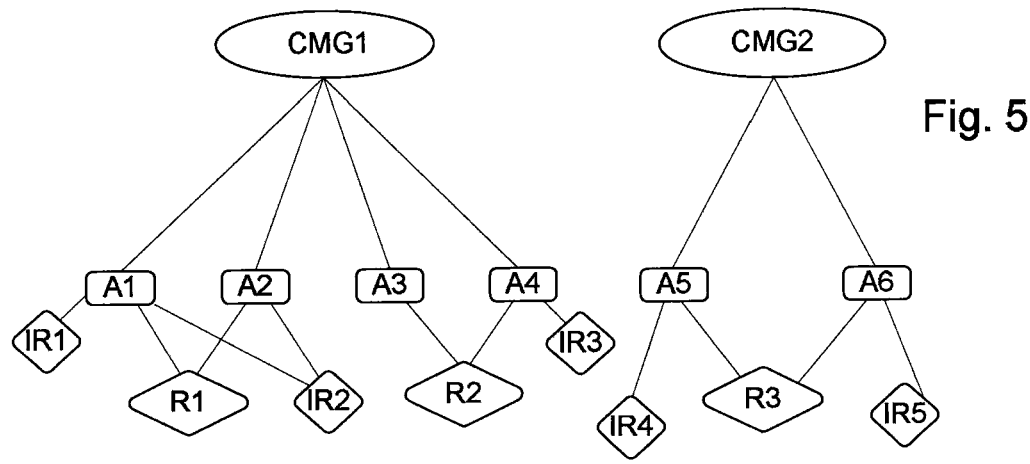
FIG. 5 illustrates how accounts can be grouped into risk netting groups in the clearing system.

Both clearing members, CM1, CM2 and CM3, and non-clearing members, NCM1, NCM2 and NCM3, can be involved in trades. Non-clearing members trade in their own names but clear through one or more clearing members. This means that from the perspective of the clearing house, it is the clearing members that are responsible for the non-clearing members' trade. With reference to FIG. 5, each clearing member CM1, CM2 of the clearing house can have a number of accounts A1 to A6. Some of these accounts may hold the member's own positions and are known as house accounts. Other accounts may hold the positions of non-clearing members and are known as client accounts. Member CM1 has four accounts, A1, A2, A3 and A4, at the clearing house. Member CM2 has two accounts A5, A6. It is contemplated that two of the accounts A1, A2 belonging to member CM1 are house accounts. One of them A1 may be for transactions carried out by traders belonging to a first trade desk and one of them A2 may be for transactions carried out by traders belonging to a second trade desk. The other two accounts A3, A4 are client accounts. Similarly, the first account A5 of member CM2 may be a house account and the second account A6 may be a client account. The accounts A1 to A6 are grouped into clearing member groups according to which clearing member is responsible for the accounts. The accounts A1 to A4 for which the first clearing member CM1 is responsible are grouped into a first clearing member group CMG1 corresponding to the first clearing member CM1. The accounts A5 and A6 of the second clearing member CM2 are grouped into a second clearing member group CMG2 corresponding to the second clearing member CM2.

For risk assessments, it is allowed to net the position in some accounts with the positions of other accounts. The accounts are therefore grouped into a number of risk netting groups R1, R2 and R3 and IR1 to IR5. When carrying out risk calculations, all positions of the accounts in the same risk netting group are netted. In other words, the risk assessment can be calculated based on the net positions of the accounts in a group. Risk assessments may also be based on the net positions of a number of risk netting groups. Some of the groups, R1 to R3, may be used to carry out risk assessments demanded by regulators. In other words, the accounts may be organised into specific groups determined in accordance with legal requirements. Other groups, IR1 to IR5, may be used to carry out risk assessments for information purposes. For example, while regulators may allow all accounts of a member to be netted for risk assessments, the clearing house may be interested in the risk associated with smaller groups of accounts. For example, the clearing house may be interested in the risks associated with smaller groups of a member's accounts to allow it to offer, as a service to its members, risk assessments for separate departments and/or specific non-clearing members clearing through the member. The clearing house should not be affected if a non-clearing member defaults. This is because as far as the clearing house is concerned the account is the responsibility of the clearing member through which the non-clearing member clears and the clearing member CM1 has provided sufficient collateral to cover the potential loss of a trade in one of the clearing member's accounts not being settled. However, the clearing member may suffer financial losses if the non-clearing member defaults. The members may use the service offered by the clearing house to determine how much collateral the different departments or non-clearing members should provide as security. The clearing house may also use information risk netting groups, IR1 to IR5, to try alternative risk algorithms, not required by the regulators, for evaluating the risks associated with the positions held by the accounts.

With reference to FIG. 5, group R1 allows the positions in accounts A1 and A2 to be netted. Group R2 allows the positions in accounts A3 and A4 to be netted. Group R3 allows the positions of account A5 and A6 to be netted. Moreover, group IR1 allows an information risk assessment to be performed for account A1. It is contemplated that trades for a specific instrument type are registered in account A1 and member CM1 is therefore interested in finding the risk associated with this account separately even though regulators allow accounts A1 and A2 to be netted. In some embodiments, an information risk group is established for each instrument type to allow the risk for each instrument type to be monitored. Alternatively, trades for a particular trader may be registered on account A1 and the member may be interested in finding out the individual risk activity of that trader by using risk group IR1. In some embodiments, it is contemplated that each trader has a separate account or a number of separate accounts and an information risk group is established for each trader's account to allow the risks associated with each trader's activities to be monitored.

IR2 comprises both account A1 and account A2. These two accounts already form risk netting group R1. However, it is possible that the clearing house or the member is interested in carrying out a different risk assessment, not required by the regulator, for the accounts of risk netting group R1. Carrying out the different risk assessment may involve running an alternative algorithm or repeating the same algorithm but with modified parameters. It may be desired to repeat the same algorithm with different parameters to "stress-test" the algorithm. A separate information risk netting group IR2 has therefore been created for these accounts. Previously, to stress-test an algorithm, the risk calculations would have to be carried out on historical data for the accounts at a later time. By using a separate information risk netting group, IR2, containing the same accounts, the algorithm can be stress-tested for the accounts of risk netting group R1 in real-time. The risk calculations for the information risk netting group IR2 can be run in parallel with the risk calculation required by the regulators for the risk netting group R1.

Account A4 belongs to risk netting group IR3. It is contemplated that the trades of a specific non-clearing member are registered in account A4 and the member CM1 may want to know the risk associated with this account to ask the non-clearing member to provide sufficient collateral as security even though regulators allow this account to be netted with account A3 in risk group R2. The clearing house may run a separate risk calculation for account A4 in risk group IR3 and continuously notify CM1 about the current risk as a service to the member CM1.

Moreover, information risk netting group IR4 only comprises account A5 and information risk netting group IR5 only comprises account A6. These information risk netting groups allow separate risk assessments to be carried out for the second member's accounts although regulators allow both of the second member's accounts to be netted.

The process of handling new trades and other events affecting the accounts and the process of carrying out the risk assessments will now be described with reference to FIGS. 6 and 7.

Figure 6:
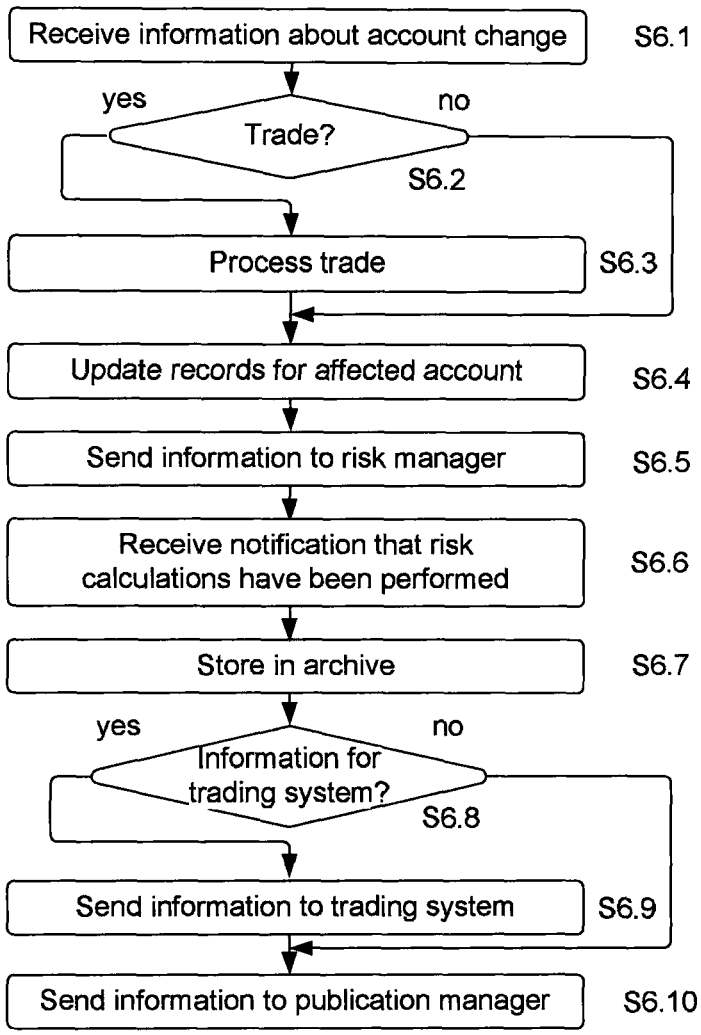
FIG. 6 illustrates a process for handling information about events affecting accounts managed by the clearing system.
Figure 7:
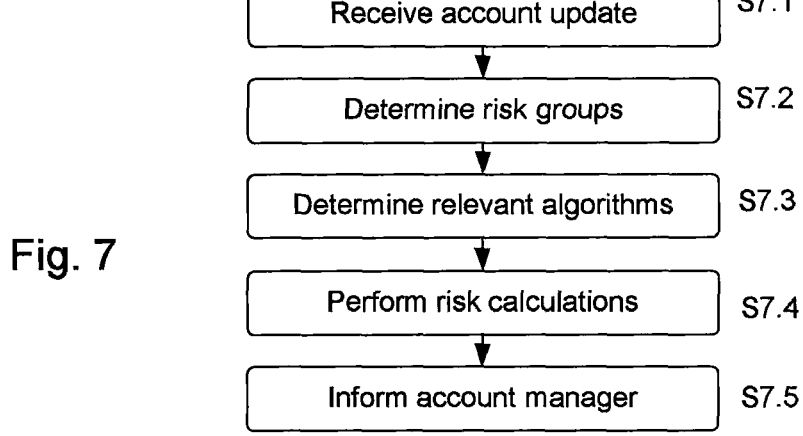
FIG. 7 illustrates a process for carrying out risk calculations in the clearing system.

With reference to FIG. 6, the account manager 4 receives a notification that information that affects an account exists at step S6.1. The information may be information about a new trade. The trade may be registered by a clearing official based on trades coming from the trading system or by a user registering a trade between two internal accounts. The information may also be new market data received through the market data receiving interface 7. In some systems, new market data may be received at regular intervals or in response to important events. Additionally, the information may be an instruction from a clearing official or a user to modify a risk group. For example, an account may have been added to a risk group, an account may have been removed from a risk group or a completely new risk group may have been created. In some embodiments, different account manager servers handle different accounts. If the change relates to an account for which a particular account manager server is responsible, the server will start to process the change. If it is determined at step S6.2 that the information relates to a new trade, the account manager controller 13 of the server instructs the trade processing arrangement 14 of the server to process the trade. The trade processing arrangement processes the trade at step S6.3. Processing of the trade is known in the art and will not be described in detail herein. Processing of the trade can comprise trade confirmation/affirmation, trade validation and debiting and crediting of accounts. When the trade has been processed, the process moves on to step S6.4 and the accounts affected by the trade are updated by the account manager controller 13. If it is found at step 6.2 that the received event is not a trade, the account manager controller 13 proceeds to update the affected accounts without instructing the trade processing arrangement to perform any trade processing. If the received information relates to a trade, the positions held on the accounts affected by the trade are updated in step S6.4. If the received information relate to changes to a risk group, the record for the account is updated with the new risk group information at step S6.4. For example, if the account belongs to a new risk group, the identification number of the new risk group is stored in the record for the account. If the received information relates to updated marked data, the value of the positions for the account is recalculated at step S6.4. Since the records and positions for the accounts have been loaded into volatile memory 15 from the account database, the changes can be made directly in the records stored in volatile memory 15. The updates to the accounts can therefore be completed in a shorter time. The updates to the account in the volatile memory 15 are copied to the volatile memory 21 of the risk servers at step S6.5. In some embodiments, the account manager server pushes the updated data to the risk manager servers to allow the risk manager servers to update the volatile memory 21 of the risk manager servers.

The risk manager starts carrying out the necessary steps to update the risk assessments for the risk groups as soon as it has been informed of changes that affect the risk groups. In some embodiments, the one or more risk servers that act as slaves to the account server responsible for processing the account update handle the risk assessments for the affected risk groups. The account manager may create a specific request for a risk assessment that is picked up by the allocated risk manager server. Alternatively, the risk manager server may determine whether an update to a risk assessment is needed based on the updated account information received from the account manager. Moreover, the risk manager server may determine that a risk assessment is required in accordance with a stored schedule. When the risk assessments have been performed, the account manager 4 receives confirmation from the risk manager at step S6.6. The changes to the account and the risk assessment are then stored in the archive 12 at step S6.7.

It is then determined at step S6.8, what information, if any, needs to be sent to the trading system. The account manager needs to inform the trading system that the trade has been settled. Moreover, if the risk assessment shows that the risk associated with a member is too high, the clearing system may also tell the trading system not to accept any more orders from the member. However, the clearing house may first ask the member to provide additional collateral. In some situations, the clearing system may send a message to both the member and to the clearing house officials. The clearing house officials can then telephone the member if the member has not provided sufficient security after a predetermined time period. As a last resort, the trading system is informed and the member is prevented from trading until additional collateral is provided. If it is determined at step S6.8 that information needs to be sent to the trading system, the account manager informs the trading system, via the trading system interface 3, at step S6.9. The account manager may "push" the information to the trading system rather than allow the information to be "pulled" by the trading system.

The account manager determines what information should be published to the users of the system and forwards the information to the publication manager 6 at step S6.10 for immediate publication to the users that are allowed access to information about the account. The account manager may push the information to be published to the publication manager. The information may include information about the account change and also the updated risk assessment for the one or more affected risk groups. The information may include a request for a member to provide additional collateral as security, as mentioned above.

By pushing the information to the risk manager and the publication manager instead of allowing the information to be requested or "pulled", the user can be informed about risk updates and account changes much quicker after the event. Moreover, since the account manager pushes details of the account change to the risk managers as soon as the account change has been recorded for the risk managers to carry out risk assessments, the new risks are assessed much quicker. In some embodiments, the account manager server may broadcast data to the risk manager servers and the publication manager servers. In some embodiments, the account manager server may push data to the risk manager servers and the publication manager servers using IP (Internet Protocol) multicast. The risk manager server and the publication manager server may reply using TCP/IP (Transmission Control Protocol/Internet Protocol).

Moreover, although it has been described with respect to FIG. 6 that the trade is processed and the account details are updated before details of the account update are sent to risk servers, it is contemplated that the account manager can instruct the risk manager to carry out the risk assessment as soon as information about a change to an account is received. Moreover, the risk assessment calculation and the processing of the trade can be done in parallel.

The process of calculating the risk will now be described in more detail with respect to FIG. 7. The risk manger controller 23 receives details of the account update at S7.1. This may be as a result of the details of the account update being copied to the volatile memory 21 of the risk manager. The account update may be received from the account manager as a result of a new trade, new market data or a change to a risk group as described with respect to FIG. 6. Since the volatile memory 21 of the risk manager stores a copy of the account information in the volatile memory 15 of the account manager 4, the risk manager has access to all the information needed to carry out the risk assessment. The risk manager controller 23 may also receive instructions to carry out a risk assessment. Alternatively, it may decide itself that a risk assessment is required. The allocated risk server determines the affected risk groups at step S7.2. As mentioned above, the allocated risk server may be a server that acts as a slave to the account server that processed the account update. After the risk groups have been determined, the risk manager controller 19 may instruct the risk calculator 20 to carry out the risk calculations for the determined risk groups.

The risk calculator 20 consults settings stored in memory 21 at step S7.3 to determine the risk calculation algorithms required for each group. It is contemplated that records in memory specify which default algorithms to be used for which instrument types. It is also contemplated that a record is stored for each risk group, specifying particular algorithms and parameters to use for that risk group. More than one risk algorithm may be used for each group. For example, different risk algorithms may be used for different instrument types.

The server then carries out the calculations at step S7.4. According to some embodiments, the risk assessment includes a margin requirement calculation. In other words, the risk calculator calculates the collateral required to cover the highest probable loss a portfolio may experience before the risk of the portfolio can be hedged in event of a default situation. The smallest entity for which a risk calculation can be carried out is a risk netting group or information risk netting group as described with respect to FIG. 5. Consequently, the calculations required for one group can be carried out by one server while the calculations required for another group can be carried out by another server or another portion of the same server. As mentioned above, an account can belong to more than one group. Different servers can carry out the risk assessments for the different groups to which the account belongs. The calculations may be carried out in parallel by the different servers. The calculations may also be carried out in parallel by different instances of the risk calculator in the same server. Alternatively, the calculations may be carried out in series by the same server. Some of the servers may have multiprocessor architecture to allow different calculations to be run at the same time. It is contemplate that, in some embodiments, different servers are used for risk assessment for different members. A server may determine the affected risk groups of an allocated member and carry out the risk assessments for the different risk groups in sequence. However, multithreading may be used for the individual calculations of a risk assessment. A server may also carry out a risk assessment based on the net position of the accounts of a number of risk groups.

The risk manager controller 19 then notifies the account manager 4 that the risk calculations have been carried out at step S7.5. The risk manager controller may pass information about the updated risks for the groups, via the account manager interface 23, to the risk manager interface 17 of the account manager 4.

It is contemplated that different servers can be used for calculating risks required by the regulators and risks calculated for information purposes. Consequently, one set of servers may be used for calculating risks based on the risk netting groups, R1, R2 and R3, and one set of servers may be used for calculating risks based on the information risk netting groups, IR1, IR2, IR3, IR4 and IR5. Alternatively, the same servers may be used for carrying out both risk assessments required by regulators and risk assessments for information purposes.

Since the account manager passes information about updates to accounts to the risk servers as soon as they have happened, the risk manager can update the risk assessments for the risk groups affected by the trade much quicker. In some embodiments, the account manager publishes a broadcast message as soon as there has been a change related to an account. An example of a change related to an account is a new trade affecting the account. The risk manager servers start carrying out a risk assessment as soon as it has received the message. The risk manager server may also carry out risk assessments at scheduled times. Moreover, since the risk assessments for the different members and the different risk groups can be updated in parallel, the updated risks are determined quicker. Different account manager servers can be provided for different members and different risk manager servers can be provided for different risk groups. A risk manager server may be allocated to carry out risk assessments for a small number of risk groups or even a single risk group. Additionally, since the clearing system pushes information about the updated risk and the settled trades between the servers of the clearing system and to the trading system and the users, the trading system can stop members that have not provided sufficient collateral earlier and members are informed that they need to provide additional collateral much faster.

Whilst specific examples of the invention have been described, the scope of the invention is defined by the appended claims and not limited to the examples. The invention could therefore be implemented in other ways, as would be appreciated by those skilled in the art.

For example, it should be realised that the structure of the clearing system shown with respect to FIGS. 1, 2, 3 and 4 is only an example and a different structure can be used. For example, the trading system interface and the publication servers can be replaced by specific communication servers that handle external communication. Also, the contents of the accounts do not have to be stored in each individual server when the system is inactive. Instead, a common storage may be used. The common storage may be located in one of the account manager servers or externally of the account manager servers.

Although it has been described that the clearing system receives created trades from a trading system, the clearing system may also receive and handle trades from banks and other institutions. The clearing system carries out the risk assessment and may report to the party that informed the clearing house of the trade and to other parties affected by the trade.

The invention claimed is:

1. A computing system for parallel calculation of risk assessments of account groups, the system comprising:
   an account database memory configured to store digitized records for a plurality of accounts;
   an account manager including:
      an account manager nonvolatile memory configured to store digitized records for a plurality of accounts;
      an account manager volatile memory; and
      an account manager processor configured to:
         create a data structure, in the account manager volatile memory, organizing the accounts having digitized records stored in the account database memory and the account manager nonvolatile memory, wherein the data structure organizes the accounts into groups based on a risk assessment score for an account type to be calculated by a clearing system; and
   a risk manager including:
      a risk manager volatile memory;
      a risk manager processor configured to:
         copy, from the account manager volatile memory to the risk manager volatile memory, the data structure;
         receive, from the account manager via a pushed update for the risk manager volatile memory, a message comprising transaction data related to a transaction from a trading system;
         determine types of risk assessment algorithms to perform on the groups, corresponding to types of securities instrument held in the accounts of at least one of the groups;
         calculate, in parallel, risk assessment scores for the groups using the determined corresponding types of risk assessment algorithms, including netting the positions held by the accounts in the groups; and
         update, in the risk manager volatile memory, for access by the account manager processor, the calculated risk assessment scores for the groups when the clearing system receives transaction data about a new transaction registered on at least one account of the groups; and
         control, in response to the updated risk assessment scores, the trading system such that the trading system is instructed to automatically clear the new transaction and execute the new transaction.

2. The computing system of claim 1, wherein the new transaction is a new trade.

3. The computing system of claim 1, wherein the new transaction is a change to market data.

4. The computing system of claim 1, wherein the new transaction comprises a change to the at least one of the groups.

5. The computing system of claim 1, wherein the risk assessment calculation comprises a margin requirement calculation.

6. The computing system of claim 1, wherein the risk manager processor is configured to calculate risk assessments using a predetermined algorithm for a first and a second group of accounts, the first and the second group of accounts comprising the same accounts, the risk manager processor being configured to calculate the risk assessment for the second group with different parameters than the risk assessment calculated for the first group to stress-test the predetermined algorithm.

7. The computing system of claim 1, wherein the risk manager processor is configured to calculate the risk assessment in real-time.

8. The computing system of claim 1, wherein the account manager processor is configured to receive transaction data about the new transaction, the risk manager processor being configured to receive transaction data about the new transaction from the account manager processor, the account manager processor comprising a first memory for storing information about the accounts, and the risk manager processor comprising a second memory for storing information about the accounts.

9. The computing system of claim 1, further comprising a trading processor configured to report matched trades to the account manager processor in real-time.

10. A computer-implemented method for parallel calculation of risk assessments of account groups in a clearing system, comprising:

creating, by an account manager processor, a data structure in an account manager volatile memory organizing a plurality of accounts into a plurality of groups, based on a risk assessment score for an account type to be calculated by the clearing system, each group comprising at least one account, wherein the data structure is created using digitized records of the plurality of accounts stored in an account manager nonvolatile memory and an account database memory;

copying, by a risk manager processor from the account manager volatile memory to a risk manager volatile memory, the data structure organizing the plurality of accounts;

receiving, from the account manager processor via a pushed update for the risk manager volatile memory, a message that includes transaction data related to a transaction from a trading system;

determining, by the risk manager processor with reference to the risk manager volatile memory and responsive to receiving the pushed update, a corresponding type of risk assessment algorithm to perform on each of a plurality of the groups based on a type of securities instrument held in the accounts of the at least one of the groups;

calculating, in a parallel computing arrangement and with the risk manager processor, a corresponding risk assessment score for each of the plurality of the groups using the determined corresponding type of risk assessment algorithm, including netting the positions held by the accounts for each of the plurality of the groups; and updating, in the risk manager volatile memory, for access by the account manager processor, the calculated risk assessment score for each of the plurality of the groups each time the clearing system receives transaction data about a new transaction registered on at least one account of each of the plurality of the groups; and controlling, in response to the updated risk assessment scores, the trading system such that the trading system is instructed to automatically clear the new transaction and execute the new transaction.

11. The method of claim 10, wherein the new transaction is a new trade.

12. The method of claim 10, wherein calculating the risk assessment comprises calculating a margin requirement.

13. The method of claim 10, further comprising reporting, by a trading processor to the account manager processor, matched trades in real-time.

* * * * *